United States Patent [19]

Buxbaum

[11] 3,998,908
[45] Dec. 21, 1976

[54] PROCESS FOR THE MANUFACTURE OF STABILIZED POLYESTER-POLYCARBONATE COPOLYMERS

[75] Inventor: Lothar Buxbaum, Lindenfels, Germany

[73] Assignee: Ciba-Geigy Corporation, Ardsley, N.Y.

[22] Filed: Nov. 18, 1974

[21] Appl. No.: 524,688

[30] Foreign Application Priority Data

Nov. 23, 1973 Switzerland ............... 16521/73

[52] U.S. Cl. ..................... 260/860; 260/45.7 P
[51] Int. Cl.$^2$ ........................ C08G 63/64
[58] Field of Search ............. 260/860, 45.7 P

[56] References Cited

UNITED STATES PATENTS

| | | | |
|---|---|---|---|
| 3,000,849 | 9/1961 | Clachan | 260/860 X |
| 3,218,372 | 11/1965 | Okamura et al. | 260/860 |
| 3,281,505 | 10/1966 | Spivack | 260/953 |
| 3,426,100 | 2/1969 | McDonough | 260/860 |
| 3,557,053 | 1/1971 | Miller | 260/45.7 P |
| 3,563,848 | 2/1971 | Bhakuni et al. | 260/45.7 P X |
| 3,746,758 | 7/1973 | Spivack | 260/45.7 P X |
| 3,752,866 | 8/1973 | Doerr | 260/860 |
| 3,819,759 | 6/1974 | Weaner et al. | 260/45.7 P X |

FOREIGN PATENTS OR APPLICATIONS

| | | |
|---|---|---|
| 722,208 | 10/1968 | Belgium |
| 1,589,020 | 4/1970 | France |
| 964,485 | 7/1964 | United Kingdom |

OTHER PUBLICATIONS

Chem. Abst., 71:102585c 1969).

*Primary Examiner*—Donald E. Czaja
*Assistant Examiner*—S. M. Person
*Attorney, Agent, or Firm*—Luther A. R. Hall

[57] ABSTRACT

The melt phase reaction and/or solid phase reaction for the manufacture of polyesters is accelerated by adding a polycarbonate and a phosphorus containing stabilizer to the reaction mixture before completion of the reaction.

17 Claims, No Drawings

PROCESS FOR THE MANUFACTURE OF STABILIZED POLYESTER-POLYCARBONATE COPOLYMERS

The present invention relates to a process for the manufacture of higher-molecular thermoplastic polyesters containing carbonate groups by reaction of linear polyesters, which have a low molecular weight and still contain hydroxyl end groups, with polycarbonates.

Thermoplastic polyesters, especially poly(ethylene terephthalate) and poly(butylene terephthalate) are manufactured on a large industrial scale and the polycondensates are converted to fibres, films or mouldings. In general, these polyesters are manufactured by reacting a low molecular dialkyl ester of a dicarboxylic acid with an alkylenediol in an ester exchange reaction in the presence of trans-esterification catalysts and then subjecting the bis-(hydroxyalkyl) ester obtained as an intermediate product to polycondensation in the melt under reduced pressure and in the presence of a catalyst.

The intermediate product can also be obtained by the direct reaction of a dicarboxylic acid with an alkylenediol.

The rate of polycondensation is relatively low and as the reaction time progresses side-reactions lead to decomposition products which firstly lower the quality of the polyester and secondly lower the rate of condensation. After prolonged periods of condensation the decomposition reaction can ultimately predominate and hence there are limits to the achievement of high degrees of polycondensation by melt condensation, with the long polycondensation times being particularly disadvantageous.

A further possible method of manufacture of high molecular polyesters is to continue the polycondensation of a polyester precondensate in granular form, manufactured by melt condensation, in the solid phase at temperatures below the melting point and in vacuo or in a stream of inert gas. As a result of the milder conditions side-reactions can in that case be repressed but relatively long reaction times are needed to achieve high degrees of polycondensation.

In order to shorten the polycondensation times, and increase the reaction rates, in these processes, DT-OS 2,100,139 and US-PS 3,444,141 propose to add diarylcarbonic acid esters before the polycondensation. If the polycondensation is carried out in the melt phase, a relatively vigorous reaction takes place after the addition of diarylcarbonic acid esters, and because of the volatility of the phenols produced the reaction mixture foams up and within a short time blocks the pipelines of the reaction vessels so that it is not possible to achieve high degrees of polycondensation. The processes usually carried out in vacuo or in a stream of inert gas have the disadvantage that because of the volatility of the carboxylic acid diaryl esters they can only be reproduced with difficulty. Even as a result of slight changes of the process conditions the polycondensates contain different amounts of carbonate groups as a result of which their properties also change. A further disadvantage of the use of carbonates is that the monofunctional alcohols liberated can lead to chain-stopping reactions and that therefore the desired increase in molecular weight is adversely influenced.

French Patent Specification No. 1,226,265 describes block polyesters of linear polyesters and polycarbonates which are obtained, for example, by polycondensation of low molecular, linear polyesters and polycarbonates in the presence of a catalyst. With this catalytic reaction, high degrees of polycondensation are not achievable in spite of the relatively long polycondensation times of 2 to 3 hours, that is to say the reaction rates are relatively low.

Furthermore it is known, from DT-OS 1,921,672, to admix small amounts of polycarbonate to a poly(ethylene terephthalate) before spinning to protect the polyester tyre cord thus produced against oxidation. Furthermore, DT-PS 1,187,793 describes blends of poly(alkylene terephthalates) and polycarbonates. Polyester-modified polycarbonates, which are manufactured by reaction of carboxylic acid diaryl esters and bis-hydroxyaryls in the presence of polyesters, are described in GB-PS 954,500, whilst GB-PS 964,485 describes modified polyesters which are obtained by polycondensation of diglycol terephthalate acid esters in the presence of small amounts of a polycarbonate.

It is now the task of the present invention to provide a process for the manufacture of higher-molecular polyesters from low molecular linear polyesters, which takes place more rapidly than known processes, can be carried out without problems even in the melt phase and gives, reproducibly, polycondensates with a defined content of carbonate groups.

The task is solved by allowing a linear polyester, which still contains free hydroxyl end groups, to react with a polycarbonate which is built up of diols of which the hydroxyl groups are bonded to one and/or different aromatic radicals. Surprisingly, the polycarbonates react rapidly with the polyesters without an added catalyst, and the reaction at the same time takes place in a readily controllable manner. If a small amount of a polycarbonate is added, the latter can undergo complete degradation during the reaction, as a result of which the polycondensate in that case only contains co-condensed carbonate groups. If larger amounts of a polycarbonate are added, a reaction product is obtained which contains carbonate groups and/or only segments of the partially degraded polycarbonate, statistically distributed. It is to be regarded as a surprising advantage of this reaction that on the one hand higher-molecular polyesters, of which the chains are virtually only linked further by carbonate groups and which therefore substantially display the pattern of properties of linear polyesters, are obtained from linear polyester precondensates, whilst, on the other hand, higher-molecular polyesters can be produced which still contain carbonate groups and/or only contain whole polycarbonate segments, as a result of which the properties of both starting components can be combined and, depending on the ratios and on the nature of the starting materials employed, can be varied to suit different applications. A further advantage is to be seen in the fact that the end products contain relatively few carboxyl groups. Evidently, the formation of carboxyl groups, which otherwise occurs if the reaction times are long, is repressed surprisingly by the process according to the invention.

The present invention accordingly relates to a process for the manufacture of thermoplastic polyesters, containing carbonate groups, from linear polyester precondensates which still contain hydroxyl end groups, which is characterised in that linear polyesters containing hydroxyl groups and having a relative viscosity of at least 1.30, measured at 30° C on a 1% strength solution in equal parts of phenol and tetrachloroethane, are allowed to react with 0.01 to 45% by weight, based on the total amount, of a polycarbonate build up from diols of which the hydroxyl groups are bonded to one or different aromatic radicals and which has a degree of polycondensation of at least 10, in the melt phase and/or solid phase, at temperatures of 170° to 320° C, and in vacuo and/or in a stream of inert gas.

Preferably, the polyester contains at least 50% of hydroxyl end groups, based on the total end groups, preferably its relative viscosity is 1.50 to 3.5, especially 1.60 to 2.5, preferably the polycarbonate has a degree of polycondensation of at least 100 and preferably the polyester is allowed to react with 0.05 to 30, especially 0.1 to 20, % by weight of the polycarbonate.

Linear polyesters which can be used are the homopolyesters and copolyesters which are obtained according to known processes from polyester-forming monomers, for example dicarboxylic acids, diols and hydroxycarboxylic acids. The only important rule for the process according to the invention is that the polyesters should possess free hydroxyl end groups which are able to react with a polycarbonate. Furthermore, the process is also suitable for unsaturated polyesters.

The following may be mentioned as examples of dicarboxylic acids: aliphatic dicarboxylic acids, such as malonic acid, succinic acid, adipic acid and sebacic acid, of which the alkylene radical can also be substituted; cycloaliphatic and cycloaliphatic-aliphatic dicarboxylic acids, such as 1,3-cyclopentanedicarboxylic acid, 1,3- or 1,4-cyclohexanedicarboxylic acid and 1-carboxymethyl-4-cyclohexanecarboxylic acid; aromatic dicarboxylic acids, such as terephthalic acid or isophthalic acid, 2,5-dibromoterephthalic acid, 2,6-naphthalenedicarboxylic acid, 4,4'-diphenyldicarboxylic acid and 4,4'-diphenylsulphonedicarboxylic acid. Further dicarboxylic acids containing two (4 to 6)-membered carbocyclic rings are described, for example, in US-PS 3,547,888 and aromatic dicarboxylic acids containing imido groups, for example N-carboxyphenyl-pyromellitic acid imide, are described in US-PS 3,217,014. Dicarboxylic acids, containing amido groups, which can easily be manufactured by, for example, the reaction of aminocarboxylic acids or diamines with dicarboxylic acid monochlorides, should also be mentioned.

Hydroxycarboxylic acids which can be used are aliphatic, cycloaliphatic, cycloaliphatic-aliphatic, aromatic and aromaticaliphatic acids. The following may be mentioned as examples: glycollic acid, β-propionic acid, β- or γ-hydroxybutyric acid, p-hydroxy-cyclohexanecarboxylic acid, para-hydroxymethylcyclohexanecarboxylic acid, m- or p-hydroxybenzoic acid and p-hydroxyphenyl-acetic acid.

Suitable diols are the aliphatic glycols, especially with 2 to 10 carbon atoms in the molecular, cycloaliphatic and cycloaliphatic-aliphatic diols, such as 1,4-dihydroxycyclohexane and 1,4-dihydroxymethylcyclohexane, and aromatic and aromaticaliphatic diols such as hydroquinone, p-xylyene glycol or 2,5-dichloro-p-xylylene glycol.

Commercially the most important thermoplastic polyesters are those consisting of at least 80 mol % of terephthalic acid radicals and at least 80 mol % of aliphatic diol radicals with 2 to 10, especially 2 to 4, carbon atoms, or radicals of 1,4-dihydroxymethylcyclohexane. These polyesters, and especially those build up from linear aliphatic diols with 2 to 4 carbon atoms and terephthalic acid, are employed preferentially.

The process according to the invention is particularly suitable for the manufacture of higher-molecular polyesters from linear polyester precondensates which have been manufactured from polyester-forming monomers which contain functional polyester-forming groups of low reactivity. In these cases, the reactivity of the functional groups can be reduced because of steric hindrance, intermolecular or intramolecular interactions or mesomerism effects. It is difficult to manufacture higher-molecular polyesters from such monomers or their polyesterforming derivatives by known processes because, due to the low reactivity of the functional groups, side-reactions which limit the achievable molecular weight and can lead to discolourations of the material, can predominate. The process is used particularly advantageously for precondensates which are built up from diols and/or hydroxycarboxylic acids with secondary and/or phenolic alcohol groups, and for diols which contain N,N-heterocyclic rings, such as, for example, 1,1-methylenebis[3-(2'-hydroxyethyl)-5,5-dimethylhydantoin] or 1,3-hydroxyalkylated benzimidazolones, of which the phenyl nucleus can also be partially or completely chlorinated and/or brominated, such as, for example, 1,3-bis-(hydroxyethyl)-benzimidazolone.

A further advantageous use of the process is in the case of linear polyester precondensates which contain radicals of thermally less stable starting components and the decomposition and side-reactions of which, during polycondensation according to known processes, result in the formation of coloured and/or brittle materials. This applies particularly to partially or completely brominated and/or chlorinated aromatic monomers which are co-condensed in the polyester for flameproofing purposes, for example tetrabromo-bisphenol A diglycol ether, 4,4'-dihydroxydecabromobiphenyl, tetrabromo-p-xylylene glycol, 2,5-dichloroterphthalic acid or 1,3-bis(hydroxyethyl)-4,5,6,7-tetrachloro- or -tetrabromo-benzimidazolone.

It is also possible to employ polyester scrap as precondensates in accordance with the process of the invention, resulting in an improvement to counteract the deterioration of the quality of this scrap caused by processing, and thereby permitting renewed use.

Where the precondensates used contain too high a proportion of carboxyl groups, the process according to the invention can be preceded by an activation consisting, for example, of carrying out an esterification and/or trans-esterification with glycols, if appropriate with simultaneous addition of a suitable catalyst. This measure is particularly valuable when using polyester scrap.

The reaction is not tied to a particular molecular weight of the precondensate. However, for economic reasons it is sensible to employ polyesters of a molecular weight which is neither too low nor too high. The polyesters used as the precondensate have a relative viscosity of at least 1.30. Using the process according to the invention it is possible to raise further, within relatively short times, the molecular weight of higher-molecular polyesters of relative viscosity of up to 3.5 which have been manufactured, for example, with the aid of a solid phase condensation process. The lower limit of the relative viscosity of the precondensate is preferably at least 1.5. In particular, however, precondensates which have been obtained by melt condensation and have a relative viscosity of 1.6 to 2.5 are employed.

The precondensates of the linear polyesters can be manufactured by esterifying or trans-esterifying dicarboxylic acids or their low molecular dialkyl esters or diaryl esters with diols in an inert atmosphere, for example a nitrogen atmosphere, in the presence of catalysts and with simultaneous removal of the resulting water or alkanol at 150°-250° C, and then carrying out the polycondensation at 200 to 270° C and under reduced pressure and in the presence of certain catalysts until the polycondensates have the desired viscosity. Advantageously, volatile diols are used in excess, so that after the esterification or trans-esterification essentially monomeric diglycol esters are obtained, which are then polycondensed in the presence of a polycondensation catalyst, whilst distilling off the excess diol in vacuo.

The trans-esterification or polycondensation catalysts used are the known metals, metal compounds or their mixtures, for example oxides, salts or organic compounds of calcium, magnesium, zinc, cadmium, manganese, titanium, cobalt, lead, germanium, tin and antimony. The amount can be 0.001 to 1% by weight, based on the acids employed. It is possible that discoloured products are formed in a polyester by reactions of the catalysts used with degradation products of the polycarbonate in the course of carrying out the process according to the invention. In that case, it is advantageous to select a different catalyst, which does not cause any discolourations. Thus it has been found, for example, that titanium compounds cause a yellow discolouration in polybutylene terephthalate, whilst organic tin compounds give white products.

If it is intended to use higher-molecular precondensates as the starting materials, the melt condensates thus produced can subsequently be subjected to a solid phase condensation and only then employed in accordance with the process of the invention.

Polycarbonates suitable for the process according to the invention are to be understood as polymers which only contain carbonate groups or polymers which contain carbonate groups and carboxylate groups, that is to say polymers which are built up from polyester and polycarbonate units.

Polymers which only contain carbonate groups are obtained by reaction of phosgene or low molecular alkyl carbonates and/or aryl carbonates with diols of which the hydroxyl groups are bonded to one and/or different aromatic radicals. Examples of diols which can be used are: hydroquinone, 2,6-dihydroxynaphthalene, 4,4'-dihydroxydiphenyl, 4,4'-dihydroxy-diphenylsulphone, 4,4'-dihydroxy-diphenylmethane and 4,4'-dihydroxydiphenyl-2,2-propane (bisphenol A). Polycarbonates from bisphenol A are preferred particulary. Polymers built up from polyester units and polycarbonate units can be manufactured, for example, by means of the process according to the invention or by carrying out the formation of the polycarbonate in the presence of polyester condensates. For this purpose, the polyester condensates can be the same as the precondensates in the process according to the invention, or can differ therefrom, depending on whether the polyesters desired as end products are to contain the same polyester units or different polyester units. However, copolymers which are obtained, for example, by reaction of phosgene with aromatic diols in the presence of dicarboxylic acid chlorides, for example terephthalic acid dichloride, are particularly valuable. The polycarbonates have a degree of polycondensation of at least 10, preferably at least 100. The process according to the invention is not influenced significantly by the molecular weight of the polycarbonates but it is possible to exert an influence on the composition of the highermolecular polyesters manufactured.

In the reaction of the polycarbonate or of the carbonate groups with the hydroxyl end groups of the polyester, phenolic alcohol groups are liberated by the degradation of the polycarbonate, but their reactivity towards the ester groups in the polyester is so low that chain degradation of the polyester by this mechanism is largely prevented. The small amounts of the aromatic diol of the polycarbonate, liberated by the reaction, can either remain in the end product or be removed during the reaction by sublimation or distillation in vacuo.

The amount added depends on the viscosity and the number of hydroxyl groups of the linear polyester and on the desired properties of the end product. It has been found that even with a small amount of added polycarbonate the reaction takes place rapidly and an increase in the molecular weight takes place in a short time. It suffices, and is preferred, to add from 0.01 to 3% by weight of the polycarbonate, and this has the additional advantage that the polycarbonate is largely degraded and the end product consists in the main of polyester chains linked by carbonate groups. As a result, the properties of the polyester undergo little change on increasing the molecular weight in accordance with the process of the invention. With increasing amount, and also with increasing molecular weight, of the added polycarbonate, complete degradation no longer occurs and instead the polyester chains are increasingly linked by segments of the polycarbonate, and one part of a polycarbonate chain also undergoes addition reaction with a hydroxyl group of the polyester. In order substantially to preserve the properties of the polyester in the higher-molecular end product and combine these properties with those of the polycarbonate, not more than 45% by weight, based on the total weight, of a polycarbonate are added, and preferably not more than 30% by weight and especially 0.1 to 20% by weight.

The polycarbonate can be added all at once or in portions and can be in the form of granules or a powder or in the fused form. Addition in portions is advantageously used if substantial amounts of the polycarbonate are added in order thus to prevent cooling of the reaction mixture. However, in that case it is also possible to add a prewarmed or fused polycarbonate in order to avoid heat loss, for example to add the polycarbonate by means of an extruder. In general, the polycarbonate is added after flushing th reactor with inert gas, or is added in vacuo, using a vacuum lock.

Known coupling reagents, such as, for example diaryl carbonates, terephthalic acid diphenyl esters, phosphates, phosphonates, polyphosphates or polyphosphonates can also be added simultaneously with the addition of a polycarbonate. Triphenyl phosphonate may be mentioned as an example of a phosphonate.

Furthermore, 0.001 to 0.5% by weight of a polycondensation catalyst can also be added together with the polycarbonate, and a further acceleration of the reaction can be achieved thereby. This catalyst should not lead to discolourations in the polyester manufactured according to the invention, as a result of reaction with degradation products of the polycarbonate.

The process according to the invention is carried out in devices, and reactors, known for melt phase condensations or solid phase condensations. In detail, the procedure followed is to add the polycarbonate, optionally together with a catalyst, to a freshly manufactured and fused, or to a refused, precondensate of a linear polyester, and to allow the reaction to take place in the melt phase at temperatures between 170° and 320° C and in vacuo and/or in a stream of inert gas until the desired viscosity is reached. An alternative procedure is to add the polycarbonate progressively, in portions.

In a further preferred embodiment of the process according to the invention, a polyester precondensate is first allowed to react with a polycarbonate in the melt phase until a certain viscosity is reached, granules are then produced, for example by means of an underwater granulator, optionally after a further addition of a polycarbonate, and the granules are dried and then subjected to a solid phase reaction. Carrying out the reaction in the melt phase and optionally subsequently in the solid phase is preferred. If the process according to the invention is also carried out in the solid phase, the addition of 30% by weight, especially of 20% by weight, is preferred.

To carry out the reaction in the solid phase, it is possible first intimately to mix a polyester precondensate, for example by regranulation, with 0.01 to 45% by weight of a polycarbonate, optionally together with a catalyst, and to react the resulting granules, at 5° to 50° C below the melting point, in vacuo and/or in a stream of inert gas, until the desired viscosity is reached. It is particularly advantageous to add not more than 30% by weight in this process, since under certain circumstances the granules stick together at the requisite reaction temperatures if the polymer contains an excessive proportion of amorphous material.

It has been found that the relative viscosities rise by up to 0.3 unit during reaction in the melt phase within a short time, in some cases in about 5 minutes, after addition of a polycarbonate. It is therefore, possible, and constitutes a preferred embodiment of the process according to the invention, to carry out the reaction in the melt phase in an apparatus in which the reactants are intimately mixed within the reaction time, for example in extruders, especially in a twin-screw extruder. The higher-molecular polyesters thus manufactured can either be converted immediately thereafter into shaped articles or be subjected to a solid state reaction in order to increase the viscosities yet further.

In this embodiment it is particularly advantageous that it is possible to carry out the reaction in the melt phase continuously and not batchwise, as when using a conventional reactor.

Before or simultaneously with the addition of the polycarbonate, or before completion of the reaction, it is possible to add further inert additives of all kinds to the polyesters, such as, for example, stabilisers, reinforcing fillers, especially glass fibres, inorganic or organic pigments, optical brighteners, delustering agents, agents which assist crystallisation and flameproofing agents, for example decabromobiphenyl or tetrabromoterephthalic anhydride, optionally together with a compound which contains an element of Main Group 5. In the latter case, the addition of stabilisers containing phosphorus is a particularly advantageous embodiment. As is generally known, these are able to prevent the increase in molecular weight during polycondensation if they are added in substantial amounts. In contrast, it has now been found that if a polycarbonate and a stabiliser containing phosphorus are added simultaneously, an increase in molecular weight occurs and a rapid increase in viscosity is observed even in short reaction times. In these cases, up to 20% by weight, relative to the polyester precondensate, can be employed. Up to 15% by weight, and especially 1 to 15% by weight, is employed preferentially. Preferred stabilisers are triaryl phosphates and triaryl phosphites, especially triphenyl phosphates and triphenyl phosphites, in which the phenyl radical can also be substituted. (3,5-Di-tert.-butyl-4-hydroxybenzyl)-bis-octadecyl phosphonate is also suitable.

The polyesters manufactured in accordance with the process of the invention can range from partially crystalline to amorphous, depending on which linear polyesters and which polycarbonates are used as the starting components, and in what ratios they are employed. Further, they are distinguished by a low content of carboxyl groups. They range from colourless to yellow in colour and are thermoplastic materials from which shaped articles with valuable properties can be manufactured in accordance with the customary shaping processes, such as casting, injection moulding and extrusion. The polyesters are particularly suitable for use as "engineering plastic" materials from which shaped articles such as gearwheels, containers for chemicals and/or foodstuffs, machine components and apparatus components, sheets, slabs, fibres and films and also semi-finished goods, which can be shaped by machining, are manufactured. Furthermore, the polyesters can also be used for coating articles, for example in accordance with the known powder coating processes.

The examples which follow explain the invention in more detail.

The relative viscosity is determined on solutions of 1 g of polyester in 100 ml of a mixture consisting of equal parts of phenol and tetrachloroethane, at 30° C. The carboxyl end group concentration is determined after dissolving the sample in pure anhydrous benzyl alcohol and subsequent dilution with chloroform, by titration with 0.02 N sodium hydroxide solution in benzyl alcohol, against Phenol Red. The values are quoted in equivalents per $10^6$ g and can be calculated from the formula $$\frac{\text{factor} \times \text{normality} \times \text{consumption [ml]} \times 1,000}{\text{sample weight [g]}}$$

EXAMPLE 1:

3,000 g of dimethyl terephthalate (DMT), 2,480 g of ethylene glycol, 1.31 g of zinc acetate and 1.4 g of antimony trioxide are filled into a 10 liter reactor equipped with a stirrer, nitrogen inlet, condenser and temperature measuring device, and the mixture is heated to 145° C. 99% of the amount of methanol to be expected theoretically are distilled off over the course of 4 hours whilst stirring and passing nitrogen through the apparatus, during which time the temperature of the reaction mixture rises to 210° C.

The reaction mixture is then transferred into a second reactor and heated to 240° C. A vacuum of 50 mm Hg is then applied over the course of half an hour by means of a water pump and at the same time the reaction temperature is raised to 275° C. Whilst keeping the reaction temperature constant, the vacuum is improved, by means of a vacuum pump, to 0.7 mm Hg over the course of half an hour and is kept thereat for a further 1.5 hours. A sample withdrawn at that time, after releasing the vacuum by means of nitrogen, shows a relative viscosity of 1.6. 0.8% by weight of bisphenol A polycarbonate of relative viscosity 1.68 is added and a vacuum of 0.7 mm Hg is immediately applied again. The relative viscosity rose to 1.92 over the course of 10 minutes. The melt is extruded through dies to give ribbons and the ribbons are chilled in water and comminuted to give cylindrical granules of 2 × 3 mm.

300 g of these granules are first dried, and crystallised, for 2 hours under a vacuum of 0.3 mm Hg at 140° C in a 1 liter Rotavapor flask dipping into an oil bath, and the reaction is then continued for 6 hours in the solid phase at 235° C under the same vacuum. The end product has a relative viscosity of 2.76.

EXAMPLE 2 (comparison example)

Polyethylene terephthalate without added polycarbonate was manufactured analogously to Example 1. In this case it required 1 hour to pass from a relative viscosity of 1.60 to 1.92. This material was also converted to granules and the reaction was continued in the solid phase in the Rotavapor flask. The relative viscosity was 2.44 after 6 hours at 235° C.

EXAMPLE 3 (comparison example)

The procedure followed was analogous to Example 1 but instead of the polycarbonate 0.8% by weight of diphenyl carbonate was added.

Hereupon, the vacuum fell to 120 mm Hg since the diphenyl carbonate partially evaporated. It was also not possible to improve the vacuum since the vacuum pipeline was clogged by diphenyl carbonate and by reaction mixture which foamed over. Hence, the reaction had to be discontinued 15 minutes after adding the diphenyl carbonate. During this time, the relative viscosity rose from 1.60 to 1.78.

EXAMPLE 4

2,910 g of dimethyl terephthalate (DMT), 1,860 g of ethylene glycol, 534 g of 1,1-methylene-bis-[3-(2'-hydroxyethyl)-5,5-dimethylhydantoin] (M-DHM) (10 mol % based on DMT), 0.99 g of zinc acetate and 1.05 g of antimony trioxide are introduced into a 10 liter reactor equipped with a stirrer, nitrogen inlet, condenser and temperature measuring device and the mixture is heated to 150° C. 98% of the amount of methanol to be expected theoretically are distilled off over the course of 3.5 hours whilst stirring and passing nitrogen through the apparatus; during this time the temperature of the reaction mixture rises to 200° C.

The reaction mixture is then heated to 240° C and a vacuum of 50 mm Hg is applied over the course of half an hour by means of a water pump and at the same time the reaction temperature is raised to 265° C. Whilst keeping the reaction temperature the same, the vacuum is improved to 0.7 mm Hg over the course of half an hour, by means of a vacuum pump, and is maintained for a further 2.5 hours. A sample withdrawn at this time by releasing the vacuum with nitrogen shows a relative viscosity of 1.60. 1.5% by weight of 2,2-(4,4'-dihydroxydiphenyl)-propane polycarbonate of relative viscosity 1.68 are added and a vacuum of 0.7 mm Hg is immediately applied again. The relative viscosity rose to 1.86 over the course of 8 minutes.

The melt is extruded through nozzles to produce ribbons which are chilled in water and comminuted to colourless cylindrical granules of size 2 × 3 mm.

300 g of these granules are pre-crystallised in acetone, and are then first dried for 1 hour under a vacuum of 0.3 mm Hg at 80° C and next heated to 210° C over the course of 6 hours, both operations being carried out in a 1 liter Rotavapor flask dipping into an oil bath. After a further 18 hours at this temperature, the relative viscosity of the granules had risen to 2.44.

EXAMPLE 5 (comparison example)

A copolyester is prepared analogously to Example 4, but without addition of the polycarbonate. After 4.5 hours reaction time at 265° C, a relative viscosity of 1.84 was reached. The colour of the granules was yellow.

During the subsequent solid phase reaction a relative viscosity of only 2.14 was achieved over the course of 96 hours.

EXAMPLES 6–22

Low molecular polyesters of a certain relative viscosity are manufactured, the reaction being carried out analogously to Examples 1 and 4. A certain amount of 2,2-(4,4'-dihydroxyphenyl)-propane polycarbonate of relative viscosity 1.68 is then added and after applying a vacuum, the reaction is continued in the melt phase. The composition of the polyesters and of the catalyst used to manufacture the precondensate, the reaction times and the characteristic data of the end products can be seen from Table 1.

After spinning and granulation, the condensates from Examples 18–22 were condensed further for 17 hours (only 16 hours in the case of Example 19) in the solid phase, the temperature being 230° C and the pressure 0.2 mm Hg. The relative viscosities were 1.97 (Example 18), 2.14 (Example 19), 2.18 (Example 20), 2.26 (Example 21) and 2.43 (Example 22).

Table 1

| Example No. | Polyester Composition | Manufactured[1] with catalyst | Coupling additive (% by weight) | $\eta_{rel}$ at addition | $\eta_{rel}$ at end | Reaction time [mins][2] | End product Colour | [COOH] |
|---|---|---|---|---|---|---|---|---|
| 6 | PET | 0.01% of zinc as the acetate and 0.03% of antimony as $Sb_2O_3$ | 1% of PC | 1.60 | 1.99 | 5 | colourless | — |
| 7 | PET | " | 0.1% of PC | 1.60 | 1.94 | 23 | " | — |
| 8 | PET | " | 0.05% of PC | 1.60 | 1.95 | 29 | " | — |
| 9 | PET | " | 0.01% of PC | 1.60 | 1.93 | 45 | " | — |
| 10 | PET | " | none | 1.60 | 1.95 | 60 | " | — |

Table 1-continued

| Example No. | Polyester Composition | Manufactured[1] with catalyst | Coupling additive (% by weight) | $\eta_{rel}$ at addition | $\eta_{rel}$ at end | Reaction time [mins][2] | End product Colour | End product [COOH] |
|---|---|---|---|---|---|---|---|---|
| 11 | PET with 10 mol % of M-DMH | 0.01% of titanium as the tetraisopropylate | none | 1.60 | 1.90 | 90 | yellow | 37 |
| 12 | PET with 10 mol % of M-DMH | '' | 0.8% of PC | 1.60 | 2.02 | 5 | '' | 13 |
| 13 | PET with 30 mol % of M-DMH | 0.01% of zinc as zinc acetate and 0.03% of antimony as $Sb_2O_3$ | 1.5% of PC | 1.60 | 1.78 | 5 | colourless | 15 |
| 14 | PBT | 0.01% of titanium as the tetraisopropylate | 1.0% of PC | 1.80 | 2.30 | 7 | colourless | — |
| 15 | PET | 0.01% of zinc as the acetate and 0.03% of antimony as $Sb_2O_3$ | 38 | 1.55 | 1.86 | 50 | colourless | — |
| 16 | PBT | 0.02% of zinc as the acetate and 0.0025% of titanium as the tetraisopropylate | 1.0 | 1.80 | 2.41 | 28 | '' | 21 |
| 17 | PET with 15 mol % of ADC and 15 mol % of CIBID | 0.01% of zinc as the acetate and 0.03% of antimony as $Sb_2O_3$ | 1.0 | 1.30 | 1.64 | 23 | yellow | — |
| 18 | PET | '' | 28 | 1.55 | 1.81 | 45 | colourless | — |
| 19 | PET | '' | 18 | 1.60 | 1.87 | 10 | '' | — |
| 20 | PET | 0.01% of zinc as the acetate and 0.03% of antimony as $Sb_2O_3$ | 1.5 | 1.50 | 1.94 | 35 | colourless | — |
| 21 | PET | '' | 1.5 | 1.60 | 1.96 | | '' | — |
| 22 | PET | '' | 1.5 | 1.72 | 1.95 | | '' | — |

[1]% by weight based on the dicarboxylic acids.
[2]Time between addition of the PC and completion of the reaction.
M-DMH = 1,1-methylene-bis-[3-(2'-hydoxyethyl)-5,5-dimethylhydantoin]
PET = poly(ethylene terephthalate)
PBT = poly(butylene terephthalate)
PC = 2,2-(4,4'-dihydroxydiphenyl)-propane polycarbonate.
COOH = concentration of carboxyl end groups in equivalents per $10^6$ g.
ADC = N,N-bis-(4-carbomethoxybenzoyl)-isophoronediamine
CIBID = 1,3-dihydroxyethyl-4,5,6,7-tetrachlorobenzimidazolone

EXAMPLES 23-27

A low molecular polyester having the relative viscosity indicated in Table 2 is manufactured analogously to Example 1. Thereafter, a certain amount (see Table 2) of 2,2-(4,4'-dihydroxyphenyl)-propane polycarbonate and a certain amount (see Table 2) of stabiliser are added and after application of a vacuum the reaction is continued in the melt phase. The viscosity, reaction time and colour can be seen from Table 2.

Table 2

| Example No. | Polyester Composition | Manufactured[1] with catalyst | Coupling additive (% by weight) | Stabiliser additive (% by weight) | $\eta_{rel}$ at addition | $\eta_{rel}$ at end | Reaction time (mins.)[2] | End product colour |
|---|---|---|---|---|---|---|---|---|
| 23 | PET with 30 mol % of M-DMH | 0.01% by weight of zinc as the acetate and 0.04% by weight of germanium as the tetrabutylate | 1.5 | 15 TPPO | 1.60 | 1.90 | 15 | colourless |
| 24 | PET with 20 mol % of CIBID | 0.01% by weight of titanium as the tetraisopropylate | 2 | 10 TPPO | 1.60 | 1.71 | 2 | light yellow |

Table 2-continued

| Example No. | Polyester Composition | Manufactured[1] with catalyst | Coupling additive (% by weight) | Stabiliser additive (% by weight) | $\eta_{rel}$ at addition | end | Reaction time (mins.)[2] | End product colour |
|---|---|---|---|---|---|---|---|---|
| 25 | PBT | " | 2 | 1 ODP | 1.80 | 2.28 | 40 | colourless |
| 26 | PBT | " | 2 | 1 TNPP | 1.80 | 2.66 | 5 | colourless |
| 27 | PBT | " | 2 | 3 TPP | 1.80 | 2.55 | 7 | colourless |

TPPO = triphenyl phosphate
TNPP = tris-nonylphenyl phosphate
TPP = triphenyl phosphite
ODP = (3,5-di-tert.-butyl-4-hydroxybenzyl)-di-octadecyl phosphonate

Comparison examples 28 and 29

3,000 g of dimethyl terephthalate, 2,800 g of 1,4-butanediol and 1.78 g of titanium tetraisopropylate are introduced, analogously to Examples 25–26, into a 10 l reactor equipped with a stirrer, nitrogen inlet and separating column. 99% of the theoretical amount of methanol are distilled off over the course of 4.5 hours whilst stirring and passing nitrogen through the reactor, during which time the temperature of the reaction mixture rises to 200° C.

The mixture is then transferred into a second reactor, a vacuum of 0.5 mm Hg is applied over the course of 1.5 hours and at the same time the reaction temperature is raised to 250° C. After 0.5 mm Hg was reached for the first time, 1% by weight of ODP is added in one case and 1% by weight of tris-nonylphenyl phosphite is added in the other case. A vacuum is then applied again and the polycondensation reaction is continued. In both cases, however, no molecular weight increase occurs. The melt remains very mobile.

EXAMPLE 30

3,000 g of dimethyl terephthalate, 2,783 g of 1,4-butanediol, 1.01 g of zinc acetate and 0.63 g of dibutyl-tin oxide are introduced into a 10 l reactor equipped with a stirrer, nitrogen inlet, condenser and temperature-measuring device and the mixture is heated to 150° C. 98% of the amount of methanol to be expected theoretically, together with some tetrahydrofurane formed, are distilled off over the course of 4 hours whilst stirring and passing nitrogen through the reactor, during which time the temperature of the reaction mixture rises to 215° C.

The reaction mixture is then transferred into a second reactor and heated to 244° C. A vacuum of 70 mm Hg is then applied over the course of half an hour by means of a water pump and at the same time the reaction temperature is raised to 255° C. The vacuum is then improved to 0.7 mm Hg over the course of half an hour whilst adjusting the reaction temperature to 250° C, and is maintained for a further 45 minutes. At this time, the relative viscosity corresponds to 1.80. 60 g of a bisphenol A polycarbonate of relative viscosity 1.68 are then added under vacuum, using a vacuum lock. The current taken by the stirrer rose so greatly over the course of 7 minutes that the reaction had to be discontinued. After spinning the melt through nozzles, and granulating the product, a relative viscosity of 2.48 is measured.

300 g of these granules are heated to 210° C under a vacuum of 0.3 mm Hg in a 1 liter Rotavapor flask dipping into an oil bath, and are left at this temperature for 5 hours. The end product from this solid phase condensation has a relative viscosity of 3.05.

EXAMPLE 31 (comparison example)

The procedure followed is exactly as in Example 30 but without addition of bisphenol A polycarbonate. 67 minutes are required to pass from a relative viscosity of 1.8 to a relative viscosity of 2.39.

What we claim is:

1. An improved process for the manufacture of thermoplastic polyesters containing carbonate groups and a stabilizer containing phosphorus from linear polyester precondensates which still contain hydroxyl groups, characterized in that linear polyesters containing hydroxyl groups and having a relative viscosity of at least 1.30, measured at 30° C on a 1% strength solution in equal parts of phenol and tetrachloroethane, are allowed to react with 0.01 to 45% by weight, based on the total amount, of a polycarbonate built up from diols of which the hydroxyl groups are bonded to one or different aromatic radicals and which polycarbonate has a degree of polycondensation of at least 10, in the melt phase or solid phase, at a temperature of 170° to 320° C and in vacuo, in a stream of inert gas, or in vacuo and a stream of inert gas wherein the improvement comprises increasing the relative viscosity of said thermoplastic polyesters by adding 1 to 15% by weight, based on the polyester precondensate, of a stabilizer containing phosphorus simultaneously with the addition of the polycarbonate.

2. A process according to claim 1, characterised in that a polyester precondensate is employed which contains at least 80 mol % of terephthalic acid radicals and at least 80 mol % of radicals of an aliphatic diol with 2 to 10 carbon atoms or of 1,4-dihydroxymethylcyclohexane.

3. A process according to claim 2, characterised in that the aliphatic diol contains 2 to 4 carbon atoms.

4. A process according to claim 2, characterised in that the polyester precondensate is built up from terephthalic acid and linear alkylenediols with 2 to 4 carbon atoms.

5. A process according to claim 1, characterised in that the polyester precondensate contains co-condensed diol radicals which possess secondary or phenolic alcohol groups.

6. A process according to claim 1, characterised in that the polyester precondensate contains at least 50% of hydroxyl end groups, based on the total end groups present.

7. A process according to claim 1, characterised in that the polyester precondensate has a relative viscosity of 1.5 to 3.5.

8. A process according to claim 7, characterised in that the polyester precondensate has a relative viscosity of 1.6 to 2.5.

9. A process according to claim 1, characterised in that 2,2-(4,4'-dihydroxydiphenyl)-propane polycarbonate is used as the polycarbonate.

10. A process according to claim 1, characterised in that the degree of polycondensation of the polycarbonate is at least 100.

11. A process according to claim 1, characterised in that 0.01 to 30% by weight of a polycarbonate are added.

12. A process according to claim 11, characterised in that 0.1 to 20% by weight of a polycarbonate are added.

13. A process according to claim 12, characterised in that 0.1 to 3% by weight of a polycarbonate are added.

14. A process according to claim 1, characterised in that the reaction in the melt phase is carried out continuously in an extruder.

15. A process according to claim 1, characterised in that polyester scrap is employed as the polyester precondensate.

16. A process according to claim 1 wherein the stabilizer containing phosphorus is a triaryl phosphate or triaryl phosphite.

17. A process according to claim 1 wherein the stabilizer containing phosphorus is selected from the group consisting of triphenyl phosphate, tris-nonylphenyl phosphate, triphenyl phosphite and bis(n-octadecyl) 3,5-di-tert-butyl-4-hydroxybenzylphosphonate.

* * * * *